US012695548B2

(12) United States Patent
Wang et al.

(10) Patent No.: US 12,695,548 B2
(45) Date of Patent: Jul. 28, 2026

(54) METHODS FOR COMMUNICATION, TERMINAL DEVICE, AND COMPUTER READABLE MEDIA

(71) Applicant: NEC CORPORATION, Tokyo (JP)

(72) Inventors: Gang Wang, Beijing (CN); Lin Liang, Beijing (CN); Yukai Gao, Beijing (CN)

(73) Assignee: NEC CORPORATION, Tokyo (JP)

( * ) Notice: Subject to any disclaimer, the term of this patent is extended or adjusted under 35 U.S.C. 154(b) by 638 days.

(21) Appl. No.: 18/008,891

(22) PCT Filed: Jun. 8, 2020

(86) PCT No.: PCT/CN2020/094977
§ 371 (c)(1),
(2) Date: Dec. 7, 2022

(87) PCT Pub. No.: WO2021/248285
PCT Pub. Date: Dec. 16, 2021

(65) Prior Publication Data
US 2023/0216614 A1    Jul. 6, 2023

(51) Int. Cl.
*H04L 1/1829*    (2023.01)
*H04W 72/23*    (2023.01)
*H04W 72/232*    (2023.01)

(52) U.S. Cl.
CPC ......... *H04L 1/1854* (2013.01); *H04W 72/232* (2023.01)

(58) Field of Classification Search
CPC ........................... H04L 1/1854; H04W 72/232
See application file for complete search history.

(56) References Cited

U.S. PATENT DOCUMENTS 11,363,626 B2    6/2022   Zhou et al.
2014/0328260 A1*  11/2014  Papasakellariou .... H04W 72/23
(Continued)

FOREIGN PATENT DOCUMENTS

CN        110875814 A     3/2020
CN        111147192 A     5/2020
(Continued)

OTHER PUBLICATIONS

CN Office Action for CN Application No. 202080101849.1, mailed on Dec. 18, 2024 with English Translation.
(Continued)

*Primary Examiner* — Ronald B Abelson
(74) *Attorney, Agent, or Firm* — Sughrue Mion, PLLC

(57)    ABSTRACT

Embodiments of the present disclosure relate to devices, methods and computer readable storage media of HARQ feedback for multiple data channels scheduled by a single DCI. The method comprises receiving, at a terminal device, control information from a network device; in accordance with a determination that transmissions of a plurality of transport blocks from the network device to the terminal device on a set of data channels are scheduled by the control information, determining a control channel for transmitting Hybrid Automatic Repeat Request, HARQ, feedback information associated with the plurality of transport blocks; and transmitting the HARQ feedback information via the control channel to the network device. In this way, the enhancement on HARQ-ACK feedback mechanism for terminal device in a case when multiple TBs/independent PDSCHs are scheduled by a single DCI can be reached, which may alleviate possible PUCCH collisions and provide more flexibility.

20 Claims, 7 Drawing Sheets

(56) References Cited

U.S. PATENT DOCUMENTS

| | | | | |
|---|---|---|---|---|
| 2019/0045533 | A1 | 2/2019 | Chatterjee et al. | |
| 2019/0082456 | A1* | 3/2019 | Kim | H04L 27/2602 |
| 2021/0014026 | A1* | 1/2021 | Papasakellariou | H04L 1/1861 |
| 2021/0092762 | A1* | 3/2021 | Choi | H04L 1/1854 |
| 2021/0099956 | A1* | 4/2021 | Nam | H04W 52/0235 |
| 2021/0120575 | A1* | 4/2021 | Yang | H04L 5/0076 |
| 2021/0184803 | A1 | 6/2021 | Ge et al. | |
| 2021/0219329 | A1 | 7/2021 | Zhou et al. | |
| 2021/0314100 | A1 | 10/2021 | Yeo et al. | |
| 2022/0095351 | A1 | 3/2022 | Baldemair et al. | |
| 2022/0103292 | A1* | 3/2022 | Hwang | H04L 1/1812 |
| 2022/0330312 | A1 | 10/2022 | Zhou et al. | |
| 2023/0239077 | A1* | 7/2023 | Gerami | H04W 72/1273 |

FOREIGN PATENT DOCUMENTS

| | | |
|---|---|---|
| EP | 3890393 | 10/2021 |
| JP | 2022-515874 A | 2/2022 |
| WO | 2018/145074 A1 | 8/2018 |
| WO | 2019029727 A1 | 2/2019 |
| WO | 2019/139908 A1 | 7/2019 |
| WO | 2019/174486 A1 | 9/2019 |
| WO | 2020/019214 A1 | 1/2020 |
| WO | 2020/032490 A1 | 2/2020 |
| WO | 2020/032695 A1 | 2/2020 |
| WO | 2020/088497 A1 | 5/2020 |
| WO | 2020/110244 A1 | 6/2020 |

OTHER PUBLICATIONS

Dong Hongcheng; Zhou Yang; Li Xiaowen, "Study on Downlink HARQ Feedback Scheduling for TD-LTE Terminals", Guangdong Communication Technology, Apr. 15, 2013, pp. 33-36.

Lijun Xie et al., "An optimization on GLRT-based detection for LTE PUCCH", 2015 IEEE/CIC international conference on communications in China (ICCC), Dec. 4, 2015.

LG Electronics, "Discussion on multiple transport blocks scheduling in MTC", 3GPP TSG RAN WG1 #96bis RI-1904607, Apr. 8-12, 2019, Sections 1-3.

LG Electronics, "Discussion on multiple transport blocks scheduling in MTC", 3GPP TSG RAN WG1 #97 RI-1906683, May 13-17, 2019, Sections 1-3.

Samsung, Scheduling of multiple transport blocks for MTC, 3GPP TSG RAN WG1 Meeting #97 RI-1906894 May 13-17, 2019, Sections 1-4.

Ericsson, "Feature lead summary for Scheduling of multiple DL/UL transport blocks for LTE-MTC", 3GPP TSG-RAN WG1Meeting #97 RI-1907580, May 13-17, 2019, pp. 1-26.

International Search Report for PCT/CN2020/094977 dated Feb. 24, 2021.

Written Opinion for PCT/CN2020/094977 dated Feb. 24, 2021.

JP Official Communication for JP Application No. 2024-025045, mailed on Dec. 17, 2024 with English Translation.

JP Office Action for JP Application No. 2022-575769, mailed on Nov. 7, 2023 with English Translation.

Vivo, "Discussion of the enhancements to configured grants", 3GPP TSG RAN WG1 #98, Prague, CZ, R1-1908143, Aug. 26-30, 2019 (6 pages).

Supplementary European Search Report dated Jun. 23, 2023 in Application No. 20940319.5.

IN Official Communication for IN Application No. 202217074562, mailed on Feb. 17, 2026.

3GPP TS 38.213 V16.0.0 (Dec. 2019), NR; Physical layer procedures for control (Release 16).

* cited by examiner

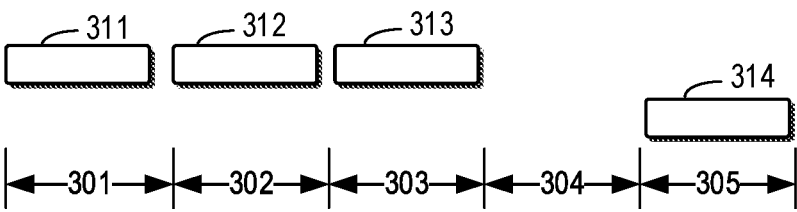
FIG. 3
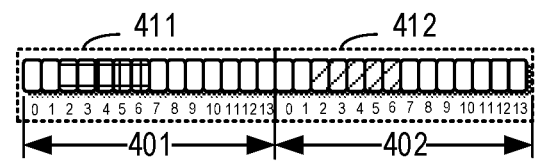
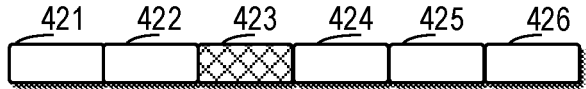
FIG. 4A
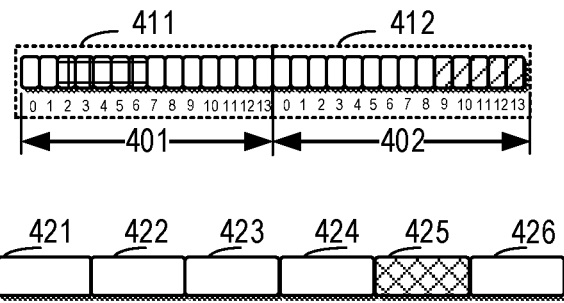
FIG. 4B

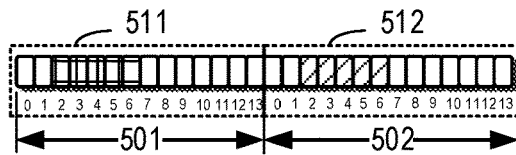
FIG. 5A
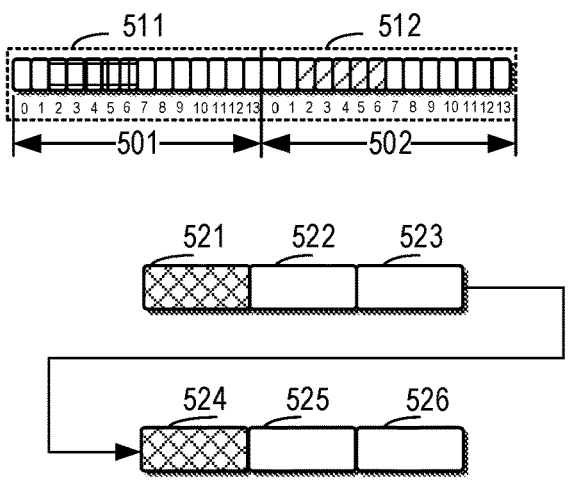
FIG. 5B
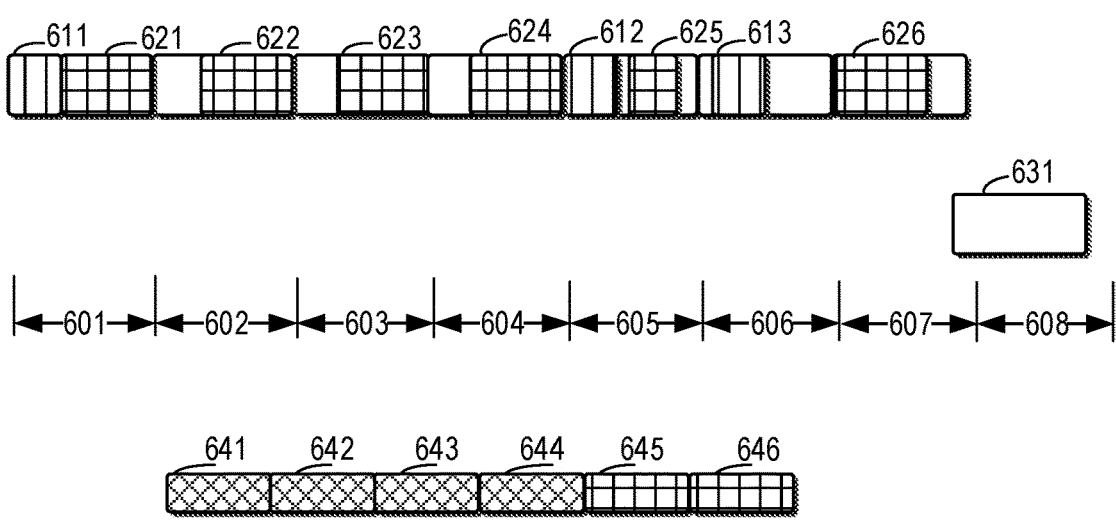
FIG. 6A

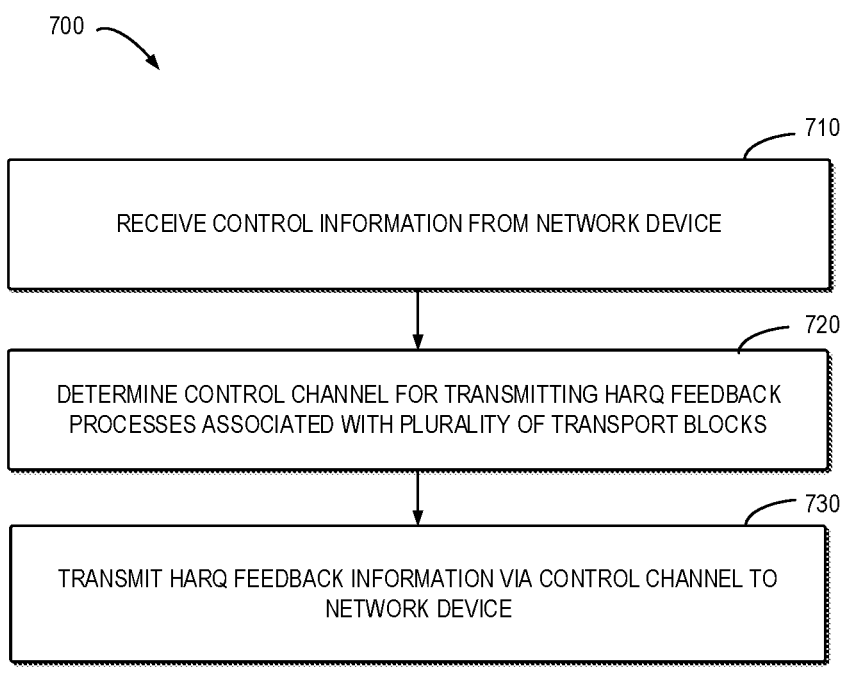

700

710

RECEIVE CONTROL INFORMATION FROM NETWORK DEVICE

720

DETERMINE CONTROL CHANNEL FOR TRANSMITTING HARQ FEEDBACK PROCESSES ASSOCIATED WITH PLURALITY OF TRANSPORT BLOCKS

730

TRANSMIT HARQ FEEDBACK INFORMATION VIA CONTROL CHANNEL TO NETWORK DEVICE

FIG. 7

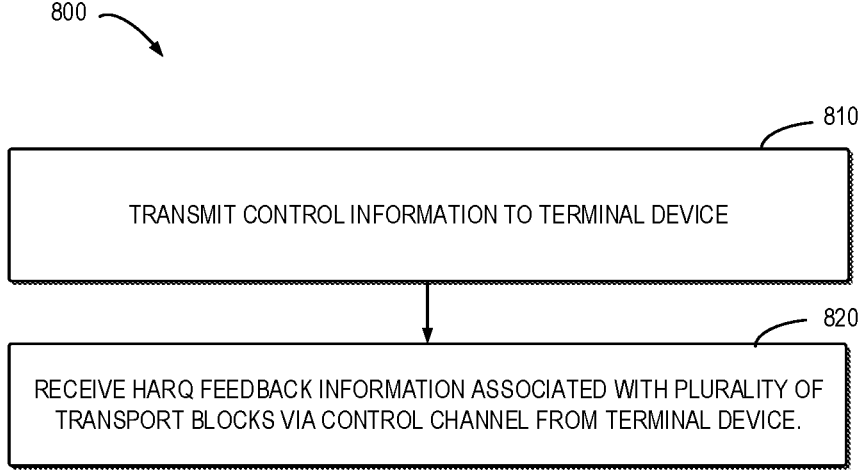

800

810

TRANSMIT CONTROL INFORMATION TO TERMINAL DEVICE

820

RECEIVE HARQ FEEDBACK INFORMATION ASSOCIATED WITH PLURALITY OF TRANSPORT BLOCKS VIA CONTROL CHANNEL FROM TERMINAL DEVICE.

FIG. 8

METHODS FOR COMMUNICATION, TERMINAL DEVICE, AND COMPUTER READABLE MEDIA

This Application is a National Stage of International Application No. PCT/CN2020/094977 filed Jun. 8, 2020.

FIELD

Embodiments of the present disclosure generally relate to the field of telecommunication and in particular, to devices, methods, devices and computer readable storage media of Hybrid Automatic Repeat Request (HARQ) feedback for multiple data channels scheduled by a single Downlink Control Information (DCI).

BACKGROUND

In third Generation Partnership Project (3GPP) Release 17 (Rel-17), due to a limited Physical Downlink Control Channels (PDCCH) capacity for Reduced Capability NR Devices, it has been considered scheduling multiple Transport Blocks (TBs)/Physical Downlink Shared Channels (PDSCHs) by a single DCI.

For the Reduced Capability NR Devices, it has been proposed that the bandwidth of the User Equipment (UE) may be reduced to 5 MHz or 10 MHz and the PDCCH monitoring may be reduced by smaller numbers of blind decodes and CCE limits, which may cause that the PDCCH capacity is limited for reduced bandwidth.

Thus, the HARQ feedback scheme may be discussed for the multiple TBs/PDSCHs scheduled by the single DCI.

SUMMARY

In general, example embodiments of the present disclosure provide a solution of HARQ feedback for multiple data channels scheduled by a single DCI.

In a first aspect, there is provided a method for communications. The method comprises receiving, at a terminal device, control information from a network device; in accordance with a determination that transmissions of a plurality of transport blocks from the network device to the terminal device on a set of data channels are scheduled by the control information, determining a control channel for transmitting Hybrid Automatic Repeat Request, HARQ, feedback information associated with the plurality of transport blocks; and transmitting the HARQ feedback information via the control channel to the network device.

In a second aspect, there is provided a method for communications. The method comprises transmitting control information from a network device to a terminal device, transmissions of a plurality of transport blocks from the network device to the terminal device on a set of data channels being scheduled by the control information; and receiving a Hybrid Automatic Repeat Request, HARQ, feedback information associated with the plurality of transport blocks via a control channel from the terminal device.

In an third aspect, there is provided a terminal device. The network device comprises a processor and a memory storing instructions. The memory and the instructions are configured, with the processor, to cause the terminal device to perform the method according to the first aspect.

In a fourth aspect, there is provided a network device. The terminal device comprises a processor and a memory storing instructions. The memory and the instructions are configured, with the processor, to cause the network device to perform the method according to the second aspect.

In a fifth aspect, there is provided a computer readable medium having instructions stored thereon. The instructions, when executed on at least one processor of a device, cause the device to perform the method according to the first aspect.

In a sixth aspect, there is provided a computer readable medium having instructions stored thereon. The instructions, when executed on at least one processor of a device, cause the device to perform the method according to the second aspect.

Other features and advantages of the embodiments of the present disclosure will also be apparent from the following description of specific embodiments when read in conjunction with the accompanying drawings, which illustrate, by way of example, the principles of embodiments of the disclosure.

BRIEF DESCRIPTION OF THE DRAWINGS

Embodiments of the disclosure are presented in the sense of examples and their advantages are explained in greater detail below, with reference to the accompanying drawings, where

FIG. 3 shows multiple PDSCHs scheduled by a single DCI and a PUCCH on which HARQ feedback associated with the multiple PDSCHs is to be transmitted in accordance with some embodiments of the present disclosure;

FIGS. 4A-4B show the construction of codebook for the HARQ feedback in accordance with some embodiments of the present disclosure;

FIGS. 5A-5B show the construction of codebook for the HARQ feedback in accordance with some embodiments of the present disclosure;

FIGS. 6A-6C show the construction of codebook for the HARQ feedback in accordance with some embodiments of the present disclosure;

FIG. 7 shows flowchart of an example method of HARQ feedback for multiple data channels scheduled by a single DCI according to some example embodiments of the present disclosure;

FIG. 8 shows flowchart of an example method of HARQ feedback for multiple data channels scheduled by a single DCI according to some example embodiments of the present disclosure.

Throughout the drawings, the same or similar reference numerals represent the same or similar element.

DETAILED DESCRIPTION

Figure 1:
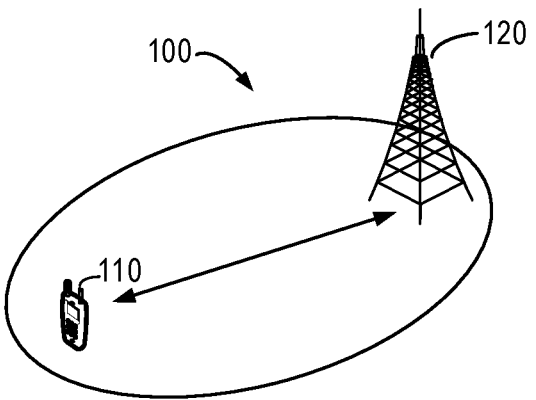
FIG. 1 illustrates an example environment in which example embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure.

The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish functionalities of various elements. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used herein, the term "communication network" refers to a network following any suitable communication standards, such as fifth generation (5G) systems, Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) new radio (NR) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR Next Generation NodeB (gNB), a Remote Radio Unit (RRU), a radio header (RH), a remote radio head (RRH), a relay, a low power node such as a femto, a pico, and so forth, depending on the applied terminology and technology.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. The terminal device may also correspond to Mobile Termination (MT) part of the integrated access and backhaul (IAB) node (a.k.a. a relay node). In the following description, the terms "terminal device", "communication device", "terminal", "user equipment" and "UE" may be used interchangeably.

Although functionalities described herein can be performed, in various example embodiments, in a fixed and/or a wireless network node, in other example embodiments, functionalities may be implemented in a user equipment apparatus (such as a cell phone or tablet computer or laptop computer or desktop computer or mobile IoT device or fixed IoT device). This user equipment apparatus can, for example, be furnished with corresponding capabilities as described in connection with the fixed and/or the wireless network node(s), as appropriate. The user equipment apparatus may be the user equipment and/or or a control device, such as a chipset or processor, configured to control the user equipment when installed therein. Examples of such functionalities include the bootstrapping server function and/or the home subscriber server, which may be implemented in the user equipment apparatus by providing the user equipment apparatus with software configured to cause the user equipment apparatus to perform from the point of view of these functions/nodes.

FIG. 1 shows an example communication network 100 in which embodiments of the present disclosure can be implemented. As shown in FIG. 1, the communication network 100 comprises a terminal device 110 and a network device 120. The terminal device 110 may communicate with the network device 120. It is to be understood that the number of network devices and terminal devices shown in FIG. 1 is given for the purpose of illustration without suggesting any limitations. The communication network 100 may include any suitable number of network devices and terminal devices.

Depending on the communication technologies, the network 100 may be a Code Division Multiple Access (CDMA) network, a Time Division Multiple Address (TDMA) network, a Frequency Division Multiple Access (FDMA) network, an Orthogonal Frequency-Division Multiple Access (OFDMA) network, a Single Carrier-Frequency Division Multiple Access (SC-FDMA) network or any others. Communications discussed in the network 100 may conform to any suitable standards including, but not limited to, New Radio Access (NR), Long Term Evolution (LTE), LTE-Evolution, LTE-Advanced (LTE-A), Wideband Code Division Multiple Access (WCDMA), Code Division Multiple Access (CDMA), cdma2000, and Global System for Mobile Communications (GSM) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols. The techniques described herein may be used for the wireless networks and radio technologies mentioned above as well as other wireless networks and radio technologies. For clarity, certain aspects of the techniques are described below for LTE, and LTE terminology is used in much of the description below.

As mentioned above, in third Generation Partnership Project (3GPP) Release 17 (Rel-17), due to a limited Physical Downlink Control Channels (PDCCH) capacity for Reduced Capability NR Devices, it has been considered scheduling multiple Transport Blocks (TBs)/Physical Downlink Shared Channels (PDSCHs) by a single DCI.

In addition to the scenario of the Reduced Capability NR Devices, it is possible to consider scheduling multiple Transport Blocks (TBs)/Physical Downlink Shared Channels (PDSCHs) by a single DCI in at least one of the followings: NR Multi-Input Multi-Output (MIMO), NR Sidelink Enhancements; NR above 52.6 GHz; Extending NR operation up to 71 GHz; enhanced Ultra-Reliable and Low Latency Communications (eURLLC)/(Enterprise Industrial Internet of Things) eIIoT; non-terrestrial networks (NTN); Narrowband Internet of Things (NB-IoT)/enhanced Machine Type Communication (eMTC) over NTN; UE Power Saving Enhancements; NR coverage enhancement; NB-IoT and LTE-MTC; Integrated access backhauling (IAB); NR Multicast and Broadcast Services and enhancements on Multi-Radio Dual-Connectivity.

For the Reduced Capability NR Devices, it has been proposed that the bandwidth of the User Equipment (UE) may be reduced to 5 MHz or 10 MHz and the PDCCH monitoring may be reduced by smaller numbers of blind decodes and CCE limits, which may cause that the PDCCH capacity is limited for reduced bandwidth. The following table shows the number of PDCCH for 10 MHz bandwidth and 30 KHz/15 KHz sub-carrier spacing, which may indicate that PDCCH capacity is limited due to reduced bandwidth.

TABLE 1

| Limited PDCCH capacity due to reduced bandwidth | | | | | | |
|---|---|---|---|---|---|---|
| | Length of CORESET | | | | | |
| Number of PDCCH | 1-symbol | | 2-symbol | | 3-symbol | |
| AL\SC(KHz) | 30 | 15 | 30 | 15 | 30 | 15 |
| 16 | 0 | 0 | 0 | 1 | 0 | 1 |
| 8 | 0 | 1 | 1 | 2 | 1 | 3 |
| 4 | 1 | 2 | 2 | 4 | 3 | 6 |
| 2 | 2 | 4 | 4 | 8 | 6 | 13 |

The term "HARQ-ACK timing $K_{1,k}$" may be referred to as a time window from downlink data reception to transmission of the UL acknowledgment. For example, the HARQ-ACK timing may be indicated via a Radio Resource Control (RRC) signaling or control information, i.e. Downlink Control Information (DCI).

For example, a set K1 of HARQ-ACK timing values is configured for the terminal device by RRC parameter, which is related to DL DCI format. For PDSCH scheduled by DCI format 1_0 or SPS PDSCH reception activated by DCI format 1_0 or SPS PDSCH release indicated by DCI format 1_0, the set of timing values between PDSCH and HARQ-ACK is defined in specification $K_1=\{1, 2, 3, 4, 5, 6, 7, 8\}$. For PDSCH scheduled by DCI format 1_1 or SPS PDSCH reception activated by DCI format 1_1 or SPS PDSCH release indicated by DCI format 1_1, the set of timing values between PDSCH and HARQ-ACK is configured by RRC parameter dl-DataToUL-ACK. For PDSCH scheduled by DCI format 1_2 or SPS PDSCH reception activated by DCI format 1_2 or SPS PDSCH release indicated by DCI format 1_2, the set of timing values between PDSCH and HARQ-ACK is configured by RRC parameter dl-DataToUL-ACK-ForDCIFormat12.

It has been specified that 1-3 bits in the PDSCH-to-HARQ_feedback timing indicator field in DL DCI is used to indicate one from the set K1 of timing values. The mapping of PDSCH-to-HARQ_feedback timing indicator field values to numbers of slots can be shown as below:

TABLE 2

| mapping of PDSCH-to-HARQ_feedback timing indicator field values to numbers of slots | | | |
|---|---|---|---|
| PDSCH-to-HARQ_feedback timing indicator | | | |
| 1 bit | 2 bits | 3 bits | Number of slots k |
| '0' | '00' | '000' | $1^{st}$ value provided by dl-DataToUL-ACK or by dl-DataToUL-ACKForDCIFormat1_2 |
| '1' | '01' | '001' | $2^{nd}$ value provided by dl-DataToUL-ACK or by dl-DataToUL-ACKForDCIFormat1_2 |
| | '10' | '010' | $3^{rd}$ value provided by dl-DataToUL-ACK or by dl-DataToUL-ACKForDCIFormat1_2 |
| | '11' | '011' | $4^{th}$ value provided by dl-DataToUL-ACK or by dl-DataToUL-ACKForDCIFormat1_2 |
| | | '100' | $5^{th}$ value provided by dl-DataToUL-ACK or by dl-DataToUL-ACKForDCIFormat1_2 |
| | | '101' | $6^{th}$ value provided by dl-DataToUL-ACK or by dl-DataToUL-ACKForDCIFormat1_2 |

TABLE 2-continued mapping of PDSCH-to-HARQ_feedback timing
indicator field values to numbers of slots PDSCH-to-HARQ_feedback timing indicator

| 1 bit | 2 bits | 3 bits | Number of slots k |
|---|---|---|---|
| | | '110' | $7^{th}$ value provided by dl-DataToUL-ACK or by dl-DataToUL-ACKForDCIFormat1_2 |
| | | '111' | $8^{th}$ value provided by dl-DataToUL-ACK or by dl-DataToUL-ACKForDCIFormat1_2 |

There are two types codebook used for HARQ feedback in licensed spectrum, namely Type-1 HARQ-ACK codebook and Type-2 HARQ-ACK codebook. Type-1 HARQ-ACK codebook can be considered as a semi-static codebook, while Type-2 HARQ-ACK codebook can be considered as dynamic codebook.

The Type-1 HARQ-ACK codebook is determined based on the factors such as PDSCH-to-HARQfeedback timing values K1, PDSCH time domain resource allocation (TDRA) table, the ratio $2^{(\mu_{DL}-\mu_{UL})}$ between the downlink SCS configuration $\mu_{in}$ and the uplink SCS configuration $\mu_{UL}$ if different numerology between DL and UL is configured and TDD configuration by TDD-UL-DL-ConfigurationCommon and TDD-UL-DL-ConfigDedicated.

In a conventional way, the HARQ-ACK window size can be determined based on the HARQ-ACK timing value set K1. Then for each HARQ-ACK timing value in the set K1, the candidate PDSCH reception occasions in each slot can be determined based on TDRA table and TDD configuration. The Candidate PDSCH reception occasions in the time domain RA table overlapped with UL configured by TDD-UL-DL-ConfigurationCommon and TDD-UL-DL-ConfigDedicated are excluded and for overlapped candidate PDSCH reception occasions, only one HARQ-ACK bit is generated based on a particular rule. When the PDSCH reception occasions are determined, the Type-1 HARQ-ACK codebook can be determined based on the PDSCH reception occasions.

The Type-2 HARQ-ACK codebook is determined based on counter DAI and total DAI in the scheduling DCI, where the HARQ-ACKs for PDSCHs scheduled by DCI pointing to the same slot for PUCCH transmission are mapped into the same HARQ-ACK codebook. First a group of DCIS for scheduling PDSCH receptions can be determined, for which the terminal device transmits according HARQ-ACK information in a same PUCCH in slot n. Then the codebook size and the HARQ-ACK information bits order can be determined based on parameters such as the counter DAI in DL DCI format, the total DAI in DCI format 1_1/DCI format 1_2, maxNrofCodeWordsScheduledByDCI, harq-ACK-SpatialBundlingPUCCH and PDSCH-CodeBlockGroup-Transmission.

In a case where multiple TBs/PDSCHs are scheduled by the single DCI, the conventional HARQ-ACK feedback mechanism for one PDCCH scheduling single-TB/or two TBs in spatial domain cannot be directly reused.

Therefore, the present disclosure proposes a mechanism for HARQ-ACK feedback mechanism. If the terminal device receives multiple TBs on data channels are scheduled by a single DCI, the terminal device may determine a control channel for transmitting the HARQ-ACK feedback and determine the corresponding codebook for carrying the HARQ-ACK feedback information. Then the terminal device may transmit the HARQ-ACK feedback information to the network device based on the determined codebook via the control channel.

Principle and implementations of the present disclosure will be described in detail below with reference to FIG. 2. For the purpose of discussion, the process 200 will be described with reference to FIG. 1. The process 200 may involve the terminal device 110 and the network device 120 as illustrated in FIG. 1.

Figure 2:
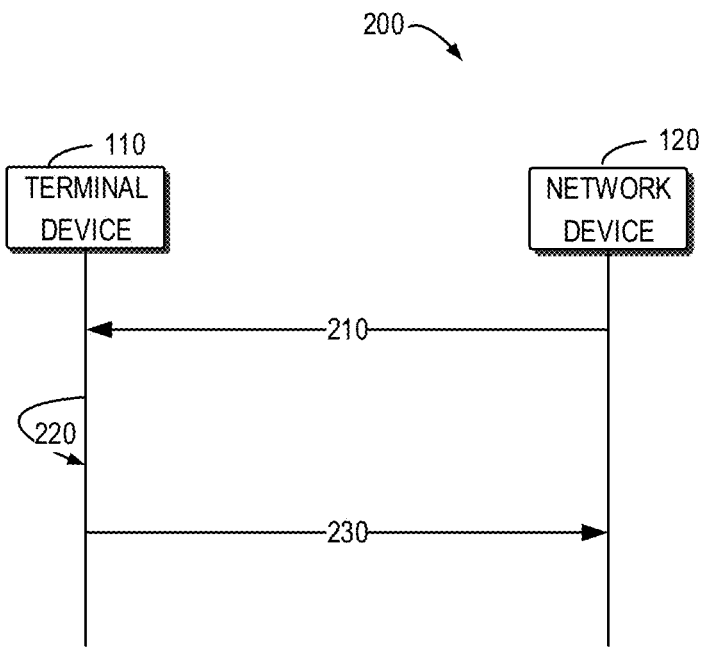
FIG. 2 shows an example signaling chart showing an example process for resource coordination in accordance with some embodiments of the present disclosure.

As shown in FIG. 2, the network device 120 may transmit 210 control information, i.e., Downlink Control information to the terminal device 110. The control information may schedule transmissions of a plurality of TBs, which are transmitted on different data channel, i.e. PDSCHs, from the network device 120 to the terminal device 110. It is to be understood that terminal device 110 doesn't expect to be scheduled these PDSCHs by a DCI in different cells. These PDSCHs should be scheduled by a DCI in one cell.

Then the terminal device 120 may first determine 220 a control channel, i.e. PUCCH for transmitting the HARQ-ACK feedback information. The terminal device 110 may determines the slot/sub-slot for the PUCCH transmission based on HARQ-ACK timing value $K_{1,k}$ indicated by the scheduling DCI. $K_{1,k}$ is the time from the slot/sub-slot of the last PDSCH reception in time domain among multiple PDSCHs to the slot/sub-slot of the transmission of the UL acknowledgment.

FIG. 3 shows multiple PDSCHs scheduled by a single DCI and a PUCCH on which HARQ feedback associated with the multiple PDSCHs is to be transmitted in accordance with some embodiments of the present disclosure.

As shown in FIG. 3, a PDCCH 311 may be transmitted on the slot 301, from which the DCI can be received. The DCI may schedule a first PDSCH 312 transmitted on the slot 302 and a second PDSCH 313 transmitted on the slot 303. For determining the slot for the PUCCH transmission, the terminal device 110 may obtain HARQ-ACK timing value $K_{1,k}$ from the DCI, which indicates the time from the slot/sub-slot of the last PDSCH reception, i.e. slot 303 shown in FIG. 3, in time domain among multiple PDSCHs to transmission of the UL acknowledgment. If $K_{1,k}=2$, then the slot 305 can be determined for the transmission of the PUCCH 314.

In some embodiments, the value range of HARQ-ACK timing K1 set (a.k.a. dl-DataToUL-ACK), e.g., the maximum $K_{1,k}$ can be expand to 31 or 63. If the terminal device 110 receives N independent PDSCHs scheduled by a DCI format from slot n−N+1 to n, the terminal device 110 will report the corresponding HARQ-ACK information for the PDSCHs in a PUCCH in a slot n+k, where k is indicated by a value of a PDSCH-to-HARQfeedback timing indicator field in the DCI format.

For reporting the HARQ-ACK feedback information for each PDSCH, the terminal device 110 may also determine feedback pattern for indicating the HARQ-ACK feedback information. The determination of the feedback pattern may depend on a reporting mode of the HARQ-ACK feedback information and the adopted type of the HARQ HARQ-ACK codebook.

In some embodiments, the terminal device 110 may only generate one HARQ-ACK bit for the multiple independent PDSCHs by bundling the HARQ-ACK value for the multiple PDSCHs. The terminal device 110 may determine respective HARQ feedback values for the plurality of TBs on the different PDSCHs and generate a bundling HARQ feedback value by performing a logical operation, such as AND-operation, to the respective HARQ feedback values. An example of the AND-operation for multiple independent PDSCHs can be shown as below:

TABLE 3

AND-operation for multiple independent PDSCHs

| PDSCH | HARQ-ACK value | | | |
|---|---|---|---|---|
| PDSCH #1 | NACK(0) | NACK(0) | ACK(1) | ACK(1) |
| PDSCH #2 | NACK(0) | ACK(1) | NACK(0) | ACK(1) |
| HARQ-ACK for PDSCH #1 & HARQ-ACK for PDSCH #2 | NACK(0) | NACK(0) | NACK(0) | ACK(1) |

For example, referring back to FIG. 3, the HARQ-ACK value for the first PDSCH 312 and the HARQ-ACK value for the second PDSCH 313 can be bundling to be a one-bit HARQ-ACK value and reported in the PUCCH 314. For example, if ACK for the first PDSCH 312, NACK for the second PDSCH 313, then the one-bit HARQ-ACK value may be ACK(1)&NACK(0)=NACK(0).

In some embodiments, the terminal device 110 may also separately generates HARQ-ACK bit for each PDSCH among the multiple PDSCHs and reports these HARQ-ACK bits in a PUCCH. That is, the terminal device 110 may determine respective HARQ feedback values for the plurality of TBs on the different PDSCHs and report these HARQ feedback values in the PUCCH.

Then the selection and use of the codebook for carrying the HARQ-ACK feedback information, including a bundled one-bit HARQ-ACK value or separated HARQ-ACK bit for each PDSCH, may be further discussed as below. As mentioned above, there are two types of HARQ-ACK feedback codebook, namely the Type-1 codebook and the Type-2 codebook.

In a case where the terminal device 110 generates one HARQ-ACK bit for the multiple independent PDSCHs, if terminal device 110 is configured with Type-1 HARQ-ACK codebook, in some embodiments, the terminal device 110 doesn't expect to be scheduled multiple PDSCHs by a DCI with different time domain resource allocation. That is, one HARQ-ACK position in the HARQ-ACK codebook is generated for the respective reception occasions of the TBs on different PDSCHs. The terminal device 110 may report one HARQ-ACK bit for the multi-PDSCHs in the corresponding HARQ-ACK position in Type-1 HARQ-ACK codebook.

FIG. 4A shows the construction of codebook for the HARQ feedback in accordance with some embodiments of the present disclosure. As shown in FIG. 4A, the reception occasion of the TB on the PDSCH 411 in the slot 401 starts from the 2nd symbol and the length of the symbols is 5, while the reception occasion of the TB on the PDSCH 412 in the slot 402 starts from the 2nd symbol and the length of the symbols is 5. Thus, the reception occasions on the PDSCH 411 and the PDSCH 412 can be considered as same.

As mentioned above, the Type-1 HARQ-ACK codebook for multi-PDSCHs can be determined based on one HARQ-ACK timing value $K_{1,k}$. Then codebook pattern may be determined for indicating a codebook size, for example, how many reporting positions is involved in the codebook. As shown in FIG. 4A, the codebook may comprise reporting positions 421 to 426. For example, if ACK for the first PDSCH 411, NACK for the second PDSCH 412, then the one-bit HARQ-ACK value may be ACK(1)&NACK(0) =NACK(0). Then the value NACK(0) can be reported in the position 423.

In some embodiments, multiple PDSCHs by a DCI may have different SLIV allocation, then more than one HARQ-ACK position is associated with multiple PDSCHs in the HARQ-ACK codebook. In this case, if the terminal device only reports the one HARQ-ACK bit for multi-PDSCHs in one of the HARQ-ACK positions associated with multiple PDSCHs in the HARQ-ACK codebook, the HARQ-ACK position can be determined, for example, based on a reception occasion associated with one of PDSCH, for example, the first PDSCH or the last PDSCH in the multiple PDSCH in a time domain.

As another option, the HARQ-ACK position can also be determined based on the PDSCH reception with smallest start symbol/or the PDSCH reception with longest duration or the PDSCH reception with lowest/highest HARQ-ACK process ID.

That is, the terminal device 110 may select a reference TB from the plurality of TB. The reference TB may be transmitted on the first/last PDSCH in a time domain or the reception occasion of the reference TB with smallest start symbol/or the reception occasion of the reference TB with longest duration or reception with lowest/highest HARQ-ACK process ID.

FIG. 4B shows the construction of codebook for the HARQ feedback in accordance with some embodiments of the present disclosure. As shown in FIG. 4B, the reception occasion of the TB on the PDSCH 411 in the slot 401 starts from the $2^{nd}$ symbol and the length of the symbols is 5, while the reception occasion of the TB on the PDSCH 412 in the slot 402 starts from the $9^{th}$ symbol and the length of the symbols is 5. Thus, the reception occasions on the PDSCH 411 and the PDSCH 412 can be considered as different. Two HARQ-ACK positions 423 and 425 are generated for the PDSCH 411 and the PDSCH 412, respectively.

In this case, if the terminal device 110 only reports valid HARQ-ACK value in the HARQ-ACK position of the last PDSCH reception, i.e. PDSCH 412, when ACK for PDSCH 411, ACK for PDSCH 412, the valid HARQ-ACK value is ACK(1)&ACK (1)=ACK (1). The terminal device 110 then only report the ACK(1) on the reporting position 425.

For the remaining HARQ-ACK position(s) associated with multiple PDSCHs in the HARQ-ACK codebook, the terminal device 110 reports fixed ACK or NACK value, or UE reports valid HARQ-ACK value for other scheduled PDSCH by the network device. For example, in FIG. 4B, the terminal device 110 may report NACK(0) in the position 423.

In a case where the terminal device 110 separately generates HARQ-ACK bit for each PDSCH among the multiple PDSCHs and reports these HARQ-ACK bits in a PUCCH, if the terminal device 110 is configured with Type-1 HARQ-ACK codebook, the Type-1 HARQ-ACK codebook determination for multi-PDSCHs are based on one HARQ-ACK timing value $K_{1,k}$, the reception occasions for the plurality of TBs on multiple PDSCHs scheduled by a DCI are same.

However, if follow current Type-1 HARQ-ACK codebook construction rule, only one HARQ-ACK position is generated, the terminal device 110 is not able to report all valid HARQ-ACK bits for multiple PDSCHs scheduled by a DCI.

In this case, for the plurality of TBs on multiple PDSCHs having same reception occasions, N HARQ-ACK positions are generated, wherein N is the maximum number of TBs/or actual number of TBs scheduled by a DCI for the terminal device.

FIG. 5A shows the construction of codebook for the HARQ feedback in accordance with some embodiments of the present disclosure. As shown in FIG. 5, reception occasions on the PDSCH 511 and PDSCH 512 are same and the Type-1 HARQ-ACK codebook for PDSCH 511 and PDSCH 512 can be determined based on one HARQ-ACK timing value $K_{1,k}$ with positions 521 to 527, 2 HARQ-ACK positions can be generated for PDSCH 511 and PDSCH 512, namely position 523 and 524.

In some embodiments, the N HARQ-ACK positions for PDSCHs in the codebook are in ascending/descending order of the HARQ-ACK process ID. As another option, the N HARQ-ACK positions for PDSCHs in codebook in the order that earlier PDSCH reception firstly.

It is also possible that the Type-1 HARQ-ACK codebook determination for multi-PDSCHs is based on multiple virtual HARQ-ACK timing values if the terminal device 110 is configured with Type-1 HARQ-ACK codebook. The virtual HARQ-ACK timing value for each PDSCH can be demined based on one HARQ-ACK timing value $K_{1,k}$ indicated by DCI and the time offset Δt, which is the time gap between the current PDSCH reception and last or first PDSCH reception.

FIG. 5B shows the construction of codebook for the HARQ feedback in accordance with some embodiments of the present disclosure. As shown in FIG. 5, reception occasions on the PDSCH 511 and PDSCH 512 are same. If the HARQ-ACK timing value for the PDSCH 512 $K_{1,k}$=2 and time offset Δt=1, a virtual HARQ-ACK timing value for the PDSCH 511 is $K_{1,k}$+Δt=3. For a determined Type 1 HARQ-ACK codebook with positions 521-526, the HARQ-ACK value for PDSCH 511 can be reported in the position 521 and the HARQ-ACK value can be reported in the position 524.

In a case where the terminal device 110 separately generates HARQ-ACK bit for each PDSCH among the multiple PDSCHs and reports these HARQ-ACK bits in a PUCCH, if the terminal device is configured with Type-2 HARQ-ACK codebook and the terminal device is configured with only one CC, HARQ-ACK information for multi-PDSCHs scheduled by a DCI and HARQ-ACK information for a single-PDSCH/or two SDM-based PDSCHs scheduled by a DCI are allowed to be multiplexed in a PUCCH.

In this case, the counter DAI is accumulative calculated for the multiple PDSCHs scheduled by single DCI. The bit widths of counter DAI field can be extended to x bits by the network device 120, e.g., x=4, the maximum value of c-DAI is 16. The HARQ-ACK position for these PDSCHs scheduled by a DCI in Type-2 codebook can be same as that in the Type-1 codebook in [0070].

FIG. 6A shows the construction of codebook for the HARQ feedback in accordance with some embodiments of the present disclosure.

As shown in FIG. 6A, the first DCI 611 with counter DAI=1 may schedule PDSCHs 621, 622, 623 and 624 on the slots 601, 602, 603 and 604, respectively. The second DCI 612 with counter DAI=5 may schedule PDSCH 625 on the slot 605 and the third DCI 613 with counter DAI=6 may schedule PDSCH 626 on the slot 607, if the terminal device 110 determines the HARQ-ACK feedback information associated with the PDSCHs 621-626 are to be transmitted on PUCCH 631 on the slot 608, the first 4 HARQ-ACK positions are generated for 4 PDSCHs scheduled by a DCI 611, the $5^{th}$ HARQ-ACK position is generated for PDSCH scheduled by DCI format 612, the 6th HARQ-ACK position is generated for PDSCH scheduled by DCI format 613.

Thus, in FIG. 6A, the HARQ-ACK values for PDSCHs 621, 622, 623 and 624 can be reported in the positions 641 to 644 and the HARQ-ACK values for PDSCH 625 and PDSCH 626 can be reported in the positions 645 and 646, respectively.

In some embodiments, if the terminal device is configured with Type-2 HARQ-ACK codebook and the terminal device is configured with only one CC, HARQ-ACK information for multi-PDSCHs scheduled by a DCI and HARQ-ACK information for a single-PDSCH/or two SDM-based PDSCHs scheduled by a DCI are allowed to be multiplexed in a PUCCH. In this case, two sub-codebooks are separately constructed for multi-PDSCHs by a DCI and single-PDSCH by a DCI. The counter DAI is separately calculated for each sub-codebook. The sub-codebook only contains HARQ-ACK bits for multi-PDSCHs is placed after the sub-codebook only contains HARQ-ACK bits for single-PDSCH.

Figure 6B:
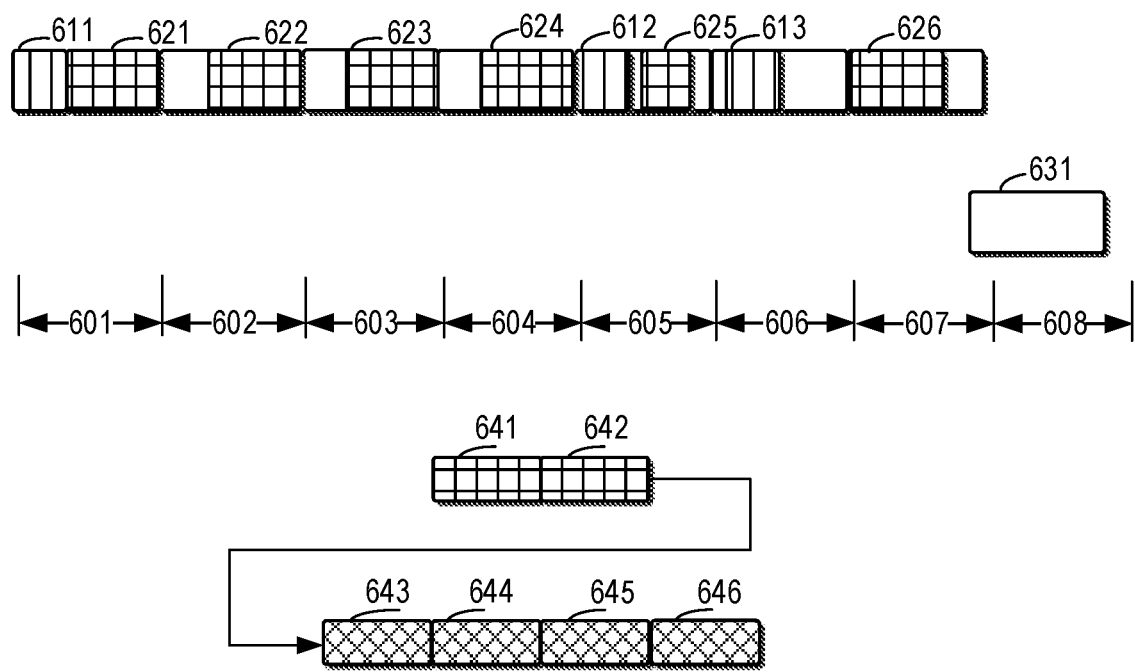

FIG. 6B shows the construction of codebook for the HARQ feedback in accordance with some embodiments of the present disclosure.

Similar with FIG. 6A, in FIG. 6B, the first DCI 611 with counter DAI=1 may schedule PDSCHs 621, 622, 623 and 624 on the slots 601, 602, 603 and 604, respectively. The second DCI 612 with counter DAI=1 may schedule PDSCH 625 on the slot 605 and the third DCI 613 with counter DAI=2 may schedule PDSCH 626 on the slot 607, if the terminal device 110 determines the HARQ-ACK feedback information associated with the PDSCHs 621-626 are to be transmitted on PUCCH 631 on the slot 608, 2 HARQ-ACK positions 641 and 642 can be generated for reporting the HARQ-ACK value of PDSCH 625 and PDSCH 626, and then 4 HARQ-ACK positions 643 to 646 can be generated for reporting the HARQ-ACK value of PDSCHs 621, 622, 623 and 624.

In some embodiments, if the terminal device is configured with Type-2 HARQ-ACK codebook and the terminal device is configured with only one Component Carrier (CC), HARQ-ACK information for multi-PDSCHs scheduled by a DCI and HARQ-ACK information for a single-PDSCH/or two SDM-based PDSCHs scheduled by a DCI are allowed to be multiplexed in a PUCCH. In this case, the terminal device 110 may generate N HARQ-ACK positions for PDSCHs for each DL scheduling DCI reception. N is the maximum number of TBs scheduled by a single DCI, N can be configured by RRC. For example, for single-PDSCH scheduled by a DCI, the terminal device may only report its valid HARQ-ACK value in the $1^{st}$ position among the N corresponding HARQ-ACK positions and report NACK in the other N−1 positions. For multi-PDSCHs scheduled by a DCI, if M PDSCHs are scheduled, M<N, then terminal device may only report M valid HARQ-ACK values in the 1st M position among the N corresponding HARQ-ACK positions and report NACK in the other N-M positions.

Figure 6C:
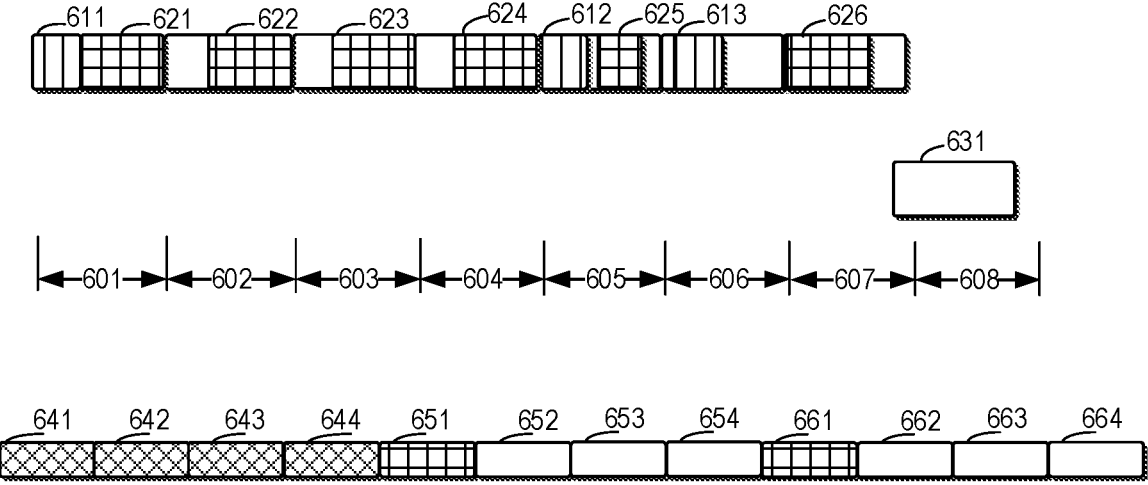

FIG. 6C shows the construction of codebook for the HARQ feedback in accordance with some embodiments of the present disclosure.

Similar with FIGS. 6A and 6B, the first DCI 611 may schedule PDSCHs 621, 622, 623 and 624 on the slots 601, 602, 603 and 604, respectively. The second DCI 612 may schedule PDSCH 625 on the slot 605 and the third DCI 613 may schedule PDSCH 626 on the slot 607, if the terminal device 110 determines the HARQ-ACK feedback information associated with the PDSCHs 621-626 are to be transmitted on PUCCH 631 on the slot 608, the terminal device 110 may determine the codebook size based on the maximal number of PDSCHs scheduled by a DCI.

Thus, 4 HARQ-ACK positions 641 to 644 can be generated for reporting the HARQ-ACK value of PDSCHs 621, 622, 623 and 624. 4 HARQ-ACK candidate positions 651 to 654 can be generated for reporting the HARQ-ACK value of PDSCH 625 and 4 HARQ-ACK candidate positions 661 to 664 can be generated for reporting the HARQ-ACK value of PDSCH 626.

As mentioned above, the terminal device may only report its valid HARQ-ACK value in the $1^{st}$ position among the N corresponding HARQ-ACK positions and report NACK in the other N−1 positions. Therefore, the HARQ-ACK value of PDSCH 625 can be reported in the position 651 and the HARQ-ACK value of PDSCH 626 can be reported in the position 661.

In this way, if the terminal device 110 determines the feedback pattern for the HARQ-ACK feedback information, referring back to FIG. 2, the terminal device 110 may transmit 230 the HARQ-ACK feedback information based on the feedback pattern via the control channel to the network device.

Furthermore, regarding to the processing timeline for the HARQ feedback, the terminal device 110 does not expect the start symbol of PUCCH Tx for HARQ-ACK for multi-PDSCHs is earlier than $$T_{proc,1}^{max}$$

ending symbol of last PDSCH reception in time domain among multi-PDSCHs, $$T_{proc,1}^{max} = (N_1 + d_{1,1} + 1) \cdot (2048 + 144) \cdot \kappa \cdot 2^{-\mu} \cdot T_C.$$

As an option, the terminal device may only reports HARQ-ACK information for PDSCH(s) that satisfy the processing timeline.

Whether the terminal device 110 can support/decode/receive unicast multi-TBs/separate TBs (a.k.a multiple independent PDSCHs) scheduled by a PDCCH is depend on capability of the terminal device 110.

If a terminal device 110 indicates a capability to receive/decode unicast multi-TBs scheduled by a PDCCH, the maximum number of unicast TBs scheduled by a PDCCH depends on UE capability. E.g., separate capabilities for different maximum number of unicast TBs scheduled by a PDCCH, up to two unicast TBs can be scheduled by a PDCCH or up to four unicast TBs can be scheduled by a PDCCH.

The actual number of unicast TBs scheduled by a PDCCH depends on the configuration of the network device. The terminal device can get the information by following ways. For example, the information can be indicated by RRC or DCI implicitly. Alternatively, the information can be indicated by RRC and DCI implicitly. For example, the number of time domain resource allocations for each entry in TDRA table. As another option, the information can be indicated by RRC or DCI explicitly. For example, a RRC parameter in PDSCH-Config, e.g., NrofTbsScheduledBySingleDCI, can be introduced or a new indicator field or re-interpret current indicator field in scheduling DCI, for example, 2-bits is used to indicate the number of unicast TBs, bit 00 may correspond to 1 TB; bit 01 may correspond to 2TBs; bit 10 may correspond to 3TBs and bit 11 may correspond to 4TBs.

In this way, the enhancement on HARQ-ACK feedback mechanism for terminal device in a case when multiple TBs/independent PDSCHs are scheduled by a single DCI can be reached, which may alleviate possible PUCCH collisions and provide more flexibility.

FIG. 7 shows a flowchart of an example method 700 of HARQ feedback for multiple data channels scheduled by a single DCI according to some example embodiments of the present disclosure. The method 400 can be implemented at the terminal device 110 as shown in FIG. 1. For the purpose of discussion, the method 400 will be described with reference to FIG. 1.

As shown in FIG. 7, at 710, the terminal device 110 receives control information from a network device.

At 720, the terminal device 110 determines a control channel for transmitting Hybrid Automatic Repeat Request, HARQ, feedback information associated with the plurality of transport blocks if the terminal device 110 determines transmissions of a plurality of transport blocks from the network device to the terminal device on a set of data channels are scheduled by the control information.

In some example embodiments, the terminal device 110 may determine a reference position of a reference transport block in a time-domain, the reference transport block is transmitted on a reference data channel in the set of data channels. The terminal device 110 may also obtain, from the control information, a time window for a HARQ feedback associated with the reference transport block and determine the control channel based on the reference position and the time window.

In some example embodiments, the terminal device 110 may generate a HARQ feedback value by performing a operation to respective HARQ feedback values for the plurality of transport blocks and determine the HARQ feedback value as the HARQ feedback information.

In some example embodiments, the terminal device 110 may determine respective HARQ feedback values for the plurality of transport blocks as the HARQ feedback information.

At 730, the terminal device 110 transmits the HARQ feedback information via the control channel to the network device.

In some example embodiments, if the terminal device 110 determines Type-1 HARQ-ACK codebook is to be adopted for carrying the HARQ feedback information, the terminal device 110 may determine respective Start and Length Indicator Values, SLIVs, of the plurality of transport blocks on the set of data channels. If the terminal device 110 the respective SLIVs are same, the terminal device 110 may determine a feedback position in the Type-1 HARQ-ACK codebook based on the SLIVs and transmit the HARQ feedback information based on the feedback position.

In some example embodiments, if the terminal device 110 determines Type-1 HARQ-ACK codebook is to be adopted for carrying the HARQ feedback information, the terminal device 110 may determine respective Start and Length Indicator Values, SLIVs, of the plurality of transport blocks on the set of data channels. If the terminal device 110 determines the respective SLIVs are different, the terminal device 110 may determine a reference SLIV corresponding to a reception of a reference transport block in the plurality of transport blocks in a time domain and determine a feedback position in the Type-1 HARQ-ACK codebook based on the reference SLIV. The terminal device 110 may transmit the HARQ feedback information based on the feedback position.

In some example embodiments, the terminal device 110 may determine the reference SLIV corresponding to the reception of the reference transport block based on at least one of the following: an index of the reference data channel for transmitting the reference transport block, a value of a start symbol indicated in the reference SLIV; a value of a length of symbols indicated in the reference SLIV and an index of a HARQ process associated with the reception of the reference transport block.

In some example embodiments, if the terminal device 110 determines Type-1 HARQ-ACK codebook is to be adopted for carrying the HARQ feedback information, the terminal device 110 may determine Start and Length Indicator Values, SLIVs, of the plurality of transport blocks on the set of data channels. If the terminal device 110 determines the respective SLIVs are same, the terminal device 110 may determine a plurality of feedback positions for indicating the respective HARQ feedback values in the Type-1 HARQ-ACK codebook based on the respective SLIVs. The terminal device 110 may determine an order for reporting the respective HARQ feedback values on the plurality of feedback positions based on the indices of HARQ processes associated with the plurality of transport blocks or an reception order of the plurality of transport blocks on the set of data channel and transmit the HARQ feedback information based on the plurality of feedback positions and the order.

In some example embodiments, if the terminal device 110 determines Type-1 HARQ-ACK codebook is to be adopted for carrying the HARQ feedback information, the terminal device 110 may obtain, from the control information, a set of time offsets for the plurality of transport blocks associated with a time window for the plurality of transport blocks associated with a reference transport blocks in the plurality of transport blocks. The terminal device 110 may determine a plurality of feedback positions for indicating the respective HARQ feedback values in the Type-1 HARQ-ACK codebook based on the time window and the set of time offsets and transmit the HARQ feedback information based on the plurality of feedback positions.

In some example embodiments, if the terminal device 110 determines Type-2 HARQ-ACK codebook is to be adopted for carrying the HARQ feedback information, the terminal device 110 may determine a codebook size of the Type-2 HARQ-ACK codebook and a plurality of feedback positions for indicating the respective HARQ feedback values and a further HARQ feedback value for a further transport block, transmitted from the network device to the terminal device on a further data channel scheduled by a further control information, in the Type-2 HARQ-ACK codebook based on the number of the set of data channels and the number the further data channel. The terminal device may determine order for reporting the respective HARQ feedback values and the further HARQ feedback value on the plurality of feedback positions based on the indices of HARQ processes associated with the plurality of transport blocks and the further transport block or an reception order of the plurality of transport blocks and the further data channel and transmit the HARQ feedback information based on the codebook size, the plurality of feedback positions and the order.

In some example embodiments, if the terminal device 110 determines Type-2 HARQ-ACK codebook is to be adopted for carrying the HARQ feedback information, the terminal device 110 may determine a codebook size of the Type-2 HARQ-ACK codebook based on a threshold number of data channels allowed to be scheduled by the control information. The terminal device may determine a plurality of feedback positions for indicating the respective HARQ feedback values and a further HARQ feedback value for the further transport block based on the threshold number, a first number of the set of data channels and a second number of the further data channel, the further transport block is transmitted from the network device to the terminal device on a further data channel scheduled by a further control information and transmit the HARQ feedback information based on the codebook size and the plurality of feedback positions and the further feedback position.

In some example embodiments, the terminal device 110 may determine respective sets of candidate feedback positions allowed to report the respective HARQ feedback values and the further HARQ feedback value in the Type-2 HARQ-ACK codebook based on the threshold number The terminal device may further determine a first portion of feedback positions for reporting the respective HARQ feedback values based on the threshold number and the first number and a second portion of feedback positions for reporting the further HARQ feedback value based on the threshold number and the second number on the respective sets of candidate feedback positions and determine the plurality of feedback positions based on the first portion of feedback positions and the second portion of feedback positions.

FIG. 8 shows a flowchart of an example method 800 of HARQ feedback for multiple data channels scheduled by a single DCI according to some example embodiments of the present disclosure. The method 800 can be implemented at the network device 120 as shown in FIG. 1. For the purpose of discussion, the method 800 will be described with reference to FIG. 1.

As shown in FIG. 8, at 810, the network device 120 transmits control information from a network device to a terminal device, transmissions of a plurality of transport blocks from the network device to the terminal device on a set of data channels being scheduled by the control information.

At 820, the network device 120 receives a Hybrid Automatic Repeat Request, HARQ, feedback information associated with the plurality of transport blocks via a control channel from the terminal device.

Figure 9:
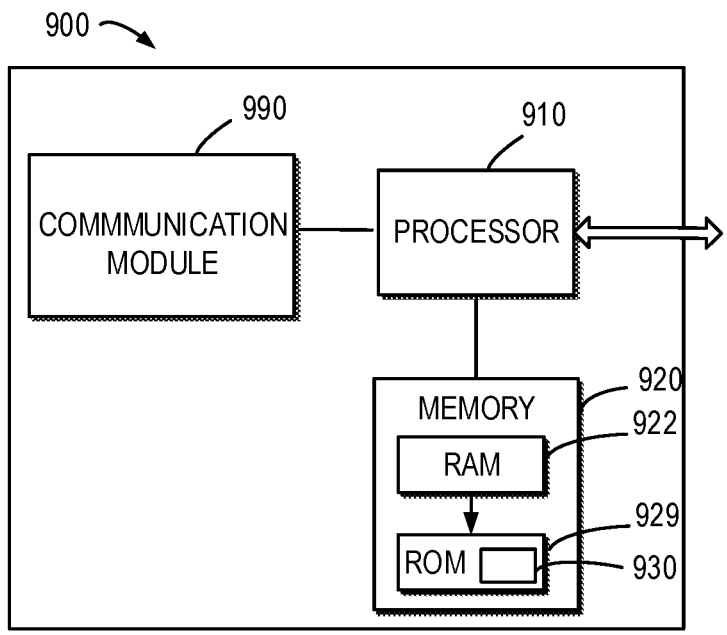
FIG. 9 shows a simplified block diagram of a device that is suitable for implementing example embodiments of the present disclosure.

FIG. 9 is a simplified block diagram of a device 900 that is suitable for implementing embodiments of the present disclosure. The device 900 may be provided to implement the communication device, for example the terminal device 110 and the network device 120 as shown in FIG. 1. As shown, the device 900 includes one or more processors 910, one or more memories 940 coupled to the processor 910, and one or more transmitters and/or receivers (TX/RX) 940 coupled to the processor 910.

The TX/RX 940 is for bidirectional communications. The TX/RX 940 has at least one antenna to facilitate communication. The communication interface may represent any interface that is necessary for communication with other network elements.

The processor 910 may be of any type suitable to the local technical network and may include one or more of the following: general purpose computers, special purpose computers, microprocessors, digital signal processors (DSPs)

and processors based on multicore processor architecture, as non-limiting examples. The device 900 may have multiple processors, such as an application specific integrated circuit chip that is slaved in time to a clock which synchronizes the main processor.

The memory 920 may include one or more non-volatile memories and one or more volatile memories. Examples of the non-volatile memories include, but are not limited to, a Read Only Memory (ROM) 924, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 922 and other volatile memories that will not last in the power-down duration.

A computer program 930 includes computer executable instructions that are executed by the associated processor 910. The program 930 may be stored in the ROM 920. The processor 910 may perform any suitable actions and processing by loading the program 930 into the RAM 920.

The embodiments of the present disclosure may be implemented by means of the program 930 so that the device 900 may perform any process of the disclosure as discussed with reference to FIGS. 2 to 8. The embodiments of the present disclosure may also be implemented by hardware or by a combination of software and hardware.

In some embodiments, the program 930 may be tangibly contained in a computer readable medium which may be included in the device 900 (such as in the memory 920) or other storage devices that are accessible by the device 900. The device 900 may load the program 930 from the computer readable medium to the RAM 922 for execution. The computer readable medium may include any types of tangible non-volatile storage, such as ROM, EPROM, a flash memory, a hard disk, CD, DVD, and the like.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, device, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the methods 700 and 800 as described above with reference to FIGS. 7-8. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing device, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, device or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, device, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A terminal device communicating with a network device, the terminal device comprising:

one or more memories storing instructions; and one or more processors configured to process the instructions to control the terminal device to:

receive multiple Physical Downlink Shared CHannel (PDSCH) transmissions, the multiple PDSCH transmissions being scheduled by Downlink Control Information (DCI);

determine a slot for a Physical Uplink Control CHannel (PUCCH) transmission, for transmitting Hybrid Automatic Repeat Request (HARQ) feedback information corresponding to the multiple PDSCH transmissions, based on first information comprised in the DCI and a first position, the first information indicating a HARQ feedback timing value, the first position indicating a slot for a last PDSCH transmission of the multiple PDSCH transmissions;

for a first case:

determine a HARQ feedback bit for the multiple PDSCH transmissions by using a binary AND operation; and transmit the determined HARQ feedback bit for the multiple PDSCH transmissions as the HARQ feedback information corresponding to the multiple PDSCH transmissions in the PUCCH transmission within the determined slot; and for a second case:

determine a HARQ feedback bit for each PDSCH of the multiple PDSCH transmissions; and transmit the determined HARQ feedback bit for each PDSCH of the multiple PDSCH transmissions as the HARQ feedback information corresponding to the multiple PDSCH transmissions in the PUCCH transmission within the determined slot.

2. The terminal device according to claim 1, wherein the one or more processors are configured to process the instructions to control the terminal device to:

determine respective Start and Length Indicator Values (SLIVs) of a plurality of transport blocks on the multiple PDSCH transmissions;

based on a determination that the respective SLIVs are different, determine a reference SLIV corresponding to a reception of a reference transport block in the plurality of transport blocks in a time domain;

determine a feedback position in the Type-1 HARQ-ACK codebook based on the reference SLIV; and transmit the HARQ feedback information based on the feedback position.

3. The terminal device according to claim 2, wherein the one or more processors are configured to process the instructions to control the terminal device to:

determine a last SLIV corresponding to the last PDSCH transmission based on at least one of the following:

an index of a reference data channel for transmitting the last PDSCH transmission;

a value of a start symbol indicated in the last SLIV;

a value of a length of symbols indicated in the last SLIV; and an index of a HARQ process associated with the reception of the last PDSCH transmission.

4. The terminal device according to claim 1, wherein the one or more processors are configured to process the instructions to control the terminal device to:

obtain, from control information, a set of time offsets for a plurality of transport blocks associated with a time window for HARQ feedback associated with a reference transport block in a plurality of transport blocks;

determine a plurality of feedback positions for indicating the respective HARQ feedback values in the Type-1 HARQ-ACK codebook based on the time window and the set of time offsets; and transmit the HARQ feedback information based on the plurality of feedback positions.

5. A terminal device communicating with a network device, the terminal device comprising:

one or more memories storing instructions; and one or more processors configured to process the instructions to control the terminal device to:

receive a single Physical Downlink Shared CHannel (PDSCH) transmission, the single PDSCH transmission being scheduled by first Downlink Control Information (DCI);

receive multiple PDSCH transmissions, the multiple PDSCH transmissions being scheduled by second DCI; and receive a Radio Resource Control (RRC) message comprising first information, wherein:

in a case where a Type-2 HARQ-ACK codebook is to be adopted for carrying HARQ feedback information, the one or more processors are configured to process the instructions to control the terminal device to:

determine, based on the first information, a number of HARQ feedback information bits for the multiple PDSCH transmissions;

determine a first sub-codebook corresponding to the single PDSCH transmission scheduled by the first DCI and a second sub-codebook corresponding to the multiple PDSCH transmissions scheduled by the second DCI;

determine positions in the second sub-codebook for HARQ feedback information bits for the multiple PDSCH transmissions, wherein each position corresponds to one of the HARQ feedback information bits for the multiple PDSCH transmissions; and generate the determined number of HARQ feedback information bits for the multiple PDSCH transmissions in the determined positions in the second sub-codebook after at least one HARQ feedback information bit for the single PDSCH transmission in the first sub-codebook.

6. The terminal device according to claim 5, wherein the one or more processors are configured to process the instructions to control the terminal device to:

determine a further feedback position for indicating a further HARQ feedback value for the single PDSCH transmission in the first sub-codebook; and transmit the HARQ feedback information based on the first sub-codebook, the second sub-codebook, the determined positions and the further feedback position.

7. The terminal device according to claim 5, wherein the one or more processors are configured to process the instructions to control the terminal device to:

determine a codebook size of the Type-2 HARQ-ACK codebook based on a threshold number of the multiple PDSCH transmissions allowed to be scheduled by the first-second DCI;

determine a plurality of feedback positions for indicating the respective HARQ feedback values and a further HARQ feedback value for a further transport block based on the threshold number, a first number of the multiple PDSCH transmissions and a second number of two or more single PDSCH transmissions, the further transport block being transmitted from the network device to the terminal device on the single PDSCH transmission; and transmit the HARQ feedback information based on the codebook size and the plurality of feedback positions and a further feedback position.

8. The terminal device according to claim 7, wherein the one or more processors are configured to process the instructions to control the terminal device to:

determine respective sets of candidate feedback positions allowed to report the respective HARQ feedback values and the further HARQ feedback value in the Type-2 HARQ-ACK codebook based on the threshold number;

determine a first portion of feedback positions for reporting the respective HARQ feedback values based on the threshold number and the first number and a second portion of feedback positions for reporting the further HARQ feedback value based on the threshold number and the second number on the respective sets of candidate feedback positions; and determine the plurality of feedback positions based on the first portion of feedback positions and the second portion of feedback positions.

9. A method for a terminal device communicating with a network device, the method comprising:

receiving multiple Physical Downlink Shared CHannel (PDSCH) transmissions, the multiple PDSCH transmissions being scheduled by Downlink Control Information (DCI);

determining a slot for a Physical Uplink Control CHannel (PUCCH) transmission, for transmitting Hybrid Automatic Repeat Request (HARQ) feedback information corresponding to the multiple PDSCH transmissions, based on first information comprised in the DCI and a first position, the first information indicating a HARQ feedback timing value, the first position indicating a slot for a last PDSCH transmission of the multiple PDSCH transmissions;

for a first case:

determining a HARQ feedback bit for the multiple PDSCH transmissions by using a binary AND operation; and transmitting the determined HARQ feedback bit for the multiple PDSCH transmissions as the HARQ feedback information corresponding to the multiple PDSCH transmissions in the PUCCH transmission within the determined slot, and for a second case:

determining a HARQ feedback bit for each PDSCH of the multiple PDSCH transmissions; and transmitting the determined HARQ feedback bit for each PDSCH of the multiple PDSCH transmissions as the HARQ feedback information corresponding to the multiple PDSCH transmissions in the PUCCH transmission within the determined slot.

10. The method according to claim 9, wherein the transmitting the HARQ feedback information comprises:

determining respective Start and Length Indicator Values (SLIVs) of a plurality of transport blocks on the multiple PDSCH transmissions;

based on a determination that the respective SLIVs are different:

determining a reference SLIV corresponding to a reception of a reference transport block in the plurality of transport blocks in a time domain;

determining a feedback position in the Type-1 HARQ-ACK codebook based on the reference SLIV; and transmitting the HARQ feedback information based on the feedback position.

11. The method according to claim 10, wherein the determining a reference SLIV comprises:

determining a last SLIV corresponding to the last PDSCH transmission based on at least one of the following:

an index of a reference data channel for transmitting the last PDSCH transmission;

a value of a start symbol indicated in the last SLIV;

a value of a length of symbols indicated in the last SLIV; and an index of a HARQ process associated with the reception of the last PDSCH transmission.

12. The method according to claim 9, wherein the transmitting the HARQ feedback information comprises:

obtaining, from control information, a set of time offsets for a plurality of transport blocks associated with a time window for HARQ feedback associated with a reference transport block in a plurality of transport blocks;

determining a plurality of feedback positions for indicating the respective HARQ feedback values in the Type-1 HARQ-ACK codebook based on the time window and the set of time offsets; and transmitting the HARQ feedback information based on the plurality of feedback positions.

13. A method for a terminal device communicating with a network device, the method comprising:

receiving a single Physical Downlink Shared CHannel (PDSCH) transmission, the single PDSCH transmission being scheduled by first Downlink Control Information (DCI);

receiving multiple (PDSCH) transmissions, the multiple PDSCH transmissions being scheduled by second DCI; and receiving a Radio Resource Control (RRC) message comprising first information, wherein:

in a case where a Type-2 HARQ-ACK codebook is to be adopted for carrying HARQ feedback information, the method comprises:

determining, based on the first information, a number of HARQ feedback information bits for the multiple PDSCH transmissions;

determining a first sub-codebook corresponding to the single PDSCH transmission scheduled by the first DCI and a second sub-codebook corresponding to the multiple PDSCH transmissions scheduled by the second DCI;

determining positions in the second sub-codebook for HARQ feedback information bits for the multiple PDSCH transmissions, wherein each position corresponds to one of the HARQ feedback information bits for the multiple PDSCH transmissions; and generating the determined number of HARQ feedback information bits for the multiple PDSCH transmissions in the determined positions in the second sub-codebook after at least one HARQ feedback information bit for the single PDSCH transmission in the first sub-codebook.

14. The method according to claim 13, the method further comprising:

determining a further feedback position for indicating a further HARQ feedback value for the single PDSCH transmission in the first sub-codebook; and transmitting the HARQ feedback information based on the first sub-codebook, the second sub-codebook, the determined positions and the further feedback position.

15. The method according to claim 13, wherein the transmitting the HARQ feedback information comprises:

determining a codebook size of the Type-2 HARQ-ACK codebook based on a threshold number of the multiple PDSCH transmissions allowed to be scheduled by the second DCI;

determining a plurality of feedback positions for indicating the respective HARQ feedback values and a further HARQ feedback value for a further transport block based on the threshold number, a first number of the multiple PDSCH transmissions and a second number of two or more single PDSCH transmissions, the further transport block being transmitted from the network device to the terminal device on the single PDSCH transmission; and transmitting the HARQ feedback information based on the codebook size and the plurality of feedback positions and the further feedback position.

16. The method according to claim 15, wherein the determining a plurality of feedback positions comprises:

determining respective sets of candidate feedback positions allowed to report the respective HARQ feedback values and the further HARQ feedback value in the Type-2 HARQ-ACK codebook based on the threshold number;

determining a first portion of feedback positions for reporting the respective HARQ feedback values based on the threshold number and the first number and a second portion of feedback positions for reporting the further HARQ feedback value based on the threshold number and the second number on the respective sets of candidate feedback positions; and determining the plurality of feedback positions based on the first portion of feedback positions and the second portion of feedback positions.

17. The terminal device according to claim 1, wherein a Type-1 HARQ-ACK codebook is adopted for carrying the HARQ feedback information.

18. The terminal device according to claim 1, wherein a first offset indicates a time duration between a current PDSCH transmission and a last PDSCH transmission.

19. The method according to claim 9, wherein a Type-1 HARQ-ACK codebook is adopted for carrying the HARQ feedback information.

20. The method according to claim 9, wherein a first offset indicates a time duration between a current PDSCH transmission and a last PDSCH transmission.

* * * * *